United States Patent
Momose

(10) Patent No.: US 6,891,590 B2
(45) Date of Patent: May 10, 2005

(54) METHOD OF DISPOSING SPACER AND METHOD OF MANUFACTURING ELECTRO-OPTIC DEVICE

(75) Inventor: Yoichi Momose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/609,590

(22) Filed: Jul. 1, 2003

(65) Prior Publication Data

US 2004/0069364 A1 Apr. 15, 2004

(30) Foreign Application Priority Data

Jul. 10, 2002 (JP) .................................... 2002-201248
Apr. 18, 2003 (JP) .................................... 2003-114361

(51) Int. Cl.$^7$ ............................................ G02F 1/1339
(52) U.S. Cl. ...................................... 349/155; 349/187
(58) Field of Search ................................ 349/155, 187

(56) References Cited

U.S. PATENT DOCUMENTS 6,054,395 A    4/2000  Knappenberger
6,156,669 A   12/2000  Knappenberger

FOREIGN PATENT DOCUMENTS

| JP | A 11-281985  |   | 10/1999 |   |            |
|----|--------------|---|---------|---|------------|
| JP | 2000162608   | * | 6/2000  | ..... | G02F/00/1339 |
| JP | A 2002-072218|   | 3/2002  |   |            |
| JP | 2003228075   | * | 8/2003  | ..... | G02F/1/1339 |
| JP | 2003-302642  | * | 10/2003 | ..... | G02F/1/1339 |

* cited by examiner

Primary Examiner—James A. Dudek
(74) Attorney, Agent, or Firm—Oliff & Berridge, PLC

(57) ABSTRACT

The invention provides a method of disposing spacers which allows spacers to be disposed in a predetermined location more accurately, and a method of manufacturing an electro-optic device, in which the method of disposing spacers is used. A method of disposing spacers in a predetermined location on a substrate for an electro-optic device using a droplet discharge unit, includes discharging droplets onto the substrate for an electro-optic device using the droplet discharge unit. The droplets are formed from a solvent having a boiling point of 150 to 250° C. and a viscosity of 10 to 40 mPa·s with the spacers suspended therein.

7 Claims, 3 Drawing Sheets

METHOD OF DISPOSING SPACER AND METHOD OF MANUFACTURING ELECTRO-OPTIC DEVICE

BACKGROUND OF THE INVENTION

1. Field of Invention

The present invention relates to a method of disposing spacers and a method of manufacturing an electro-optic device. More specifically, the invention relates to a technique of disposing spacers in a predetermined location.

2. Description of Related Art

A related art liquid crystal device is configured to have a lower substrate and an upper substrate, the peripheral portions of which are glued together via a seal material with a predetermined space, and a liquid crystal layer is sealed in between the paired substrates. In this liquid crystal device, a large number of sphere-shaped spacers are disposed between the substrates in order to make the spacing between the substrates uniform in a substrate surface. A related art method uses an ink jet unit to dispose such spacers on a substrate. In this case, a solvent for ink jetting is required. Japanese Published Unexamined Patent Application JP-A2002-72218 (hereinafter "JP 218") discloses an exemplary solvent in which a mixture of water and isopropyl alcohol is used, for example.

SUMMARY OF THE INVENTION

Commonly, it is an ideal that in the case where spacers are disposed in a predetermined location of a substrate by discharging a mixture of the spacers and a solvent onto a substrate surface using an ink jet unit, a mixture of a solvent and spacers discharged from an ink jet nozzle drops to a substrate in a nearly sphere-shaped state and spreads out over the substrate surface as a single droplet at the time of reaching the substrate. However, when using a solvent as disclosed in JP 218 noted above, especially a water-based solvent, a mixture of spacers and the solvent sometimes cannot be discharged from an ink jet nozzle with stability because of its low viscosity.

More specifically, the solution discharged from an ink jet nozzle does not necessarily make up one droplet because of its low viscosity, and as such sometimes it is divided into a plurality of droplets to fall to a substrate surface. In some cases, even if the solution from the nozzle reaches a substrate surface in the form of a droplet, it is broken down into a plurality of droplets and scattered when reaching the substrate. In these cases, it is difficult to dispose spacers in a target location, and the variations in spacer-disposed location are produced. This may lead to unevenness of cell thickness in a liquid crystal device and cause display defects.

After dropping the solution, spacers are to be disposed in a predetermined location by evaporating the solvent thereof. However, also in this case, when the solvent has a low boiling point, the evaporation speed thereof becomes too fast, thereby variations in spacer-disposed location may be ultimately produced. Further, in an extreme case, the solvent boils on a substrate surface, and thus a trouble such that spacers are scattered on the substrate may occur.

The invention addresses the above and/or other problems, and provides a method of disposing spacers, by which spacers can be disposed in a predetermined location more accurately. Further, the invention provides a method of manufacturing an electro-optic device using the method of disposing spacers.

To address or solve the above, the method of disposing spacers of the invention disposes spacers in a predetermined location of a substrate for an electro-optic device using a droplet discharge unit. The method includes: discharging droplets onto the substrate for an electro-optic device with the droplet discharge unit. The droplets are formed from a solvent having a boiling point of 150 to 250° C. and a viscosity of 10 to 40 mPa·s with the spacers suspended therein.

According to the method of disposing spacers using a droplet discharge unit, the boiling point of a solvent, in which spacers are suspended, is 150 to 250° C., and as such the evaporation rate of the solvent after the dropping of droplets is not too fast and therefore the variations in spacer-disposed location as described above is less likely to occur, and a problem such that the solvent evaporates on a substrate surface while dropping is also less likely to occur. Thus, it becomes possible to dispose spacers in a predetermined location accurately. In addition, because the solvent has a viscosity of 10 to 40 mPa·s, a droplet is dropped in a single spherical form instead of being divided into a plurality of droplets while dropping. Therefore, a problem such that a droplet is scattered into a plurality of droplets when reaching a substrate is less likely to occur. Accordingly, the fixed point arrangement of spacers can be realized with reliability.

When a solvent having a boiling point below 150° C. is used, the evaporation rate of the solvent becomes too fast and thus variations in spacer-arranged location may be produced. In contrast, using a solvent having a boiling point above 250° C. increases a heating temperature or heating time required to evaporate the solvent unnecessarily. This may cause a problem, such as deformation of a substrate for an electro-optic device, and especially in a substrate with an alignment layer to properly orient an electro-optic material, may produce the disorder of the orientation in the alignment layer. In the case of using a solvent having a boiling point below 180° C., a droplet may not be concentrated at one point in a very rare case, and therefore it is preferable to use a solvent having a boiling point of 180 to 250° C.

Further, when a solvent having a viscosity below 10 mPa·s is used, a problem such that a droplet thereof is dispersed into a plurality of droplets while dropping, or scattered into a plurality of droplets by collision with a substrate may be produced. In contrast, a solvent having a viscosity above 40 mPa·s is used, it may become difficult to stably discharge droplets from a discharging port of a droplet discharge unit, and may cause a trouble such that droplets are accumulated in a tip portion of the discharging port. When using a solvent having a viscosity below 20 mPa·s may cause, in a very rare case, a droplet thereof to be scattered into a plurality of droplets on a substrate after the droplet has reached the substrate. Also, when a solvent having a viscosity above 35 mPa·s is used, in a very rare case, droplets may not be discharged. Therefore, it is preferable to use a solvent having a viscosity of 20 to 35 mPa·s.

In the method of disposing spacers of the invention, a substrate for an electro-optic device may be heated to 60 to 150° C. to evaporate the solvent after having fallen the droplets. Since a solvent having a boiling point of 150 to 250° C. is used, setting a heating temperature to 60 to 150° C. can make the evaporation rate to be in a proper speed, thereby reducing, preventing or minimizing the occurrence of variations in spacer-disposed location. Setting a heating temperature below 60° C. can make a heating time too long. Further, setting a heating temperature above 150° C. may produce the disorder of orientation in an alignment layer especially for a substrate with the alignment layer to properly orient an electro-optic material. It is preferable to set a heating temperature of a substrate in the evaporation step to 90 to 140° C.

In discharging of droplets, the droplets may be dropped only on non-pixel regions of a substrate for an electro-optic device. In the method of disposing spacers of the invention, the use of a droplet discharge unit allows spacers to be disposed at any given locations. Especially in an electro-optic device, it is preferable to dispose spacers in a non-pixel region (black matrix) between pixels. In this case, for example, it is possible to reduce the effect of possible liquid crystal alignment defects around spacers on display.

In the invention, non-hydrous solvents may be used as a solvent. In the case where a solvent contains water, the viscosity becomes lower, and variations in spacer-arranged location may be produced because such solvent has a boiling point of about 100° C. Concretely, the solvent which can be used in the invention is, for example, one solvent or a mixture of at least two solvents selected from 1-nonanol, 3,5,5-trimethyl-1-hexanol, 1-decanol, 1-dodecanol, 1,2-ethanediol, 2-butene-1,4-diol, 2-methyl-2,4-pentadiol, phenol, 2-pyrrolidone, 2-phenoxyethanol, 2,2'-dihydroxydiethyl ether, and 2-(2-methoxyethoxy) ethanol.

The method of manufacturing an electro-optic device of the invention manufactures an electro-optic device having a pair of substrates and an electro-optic material held between the substrates. The method includes: disposing spacers on at least one of the pair of substrates according to the method of disposing spacers described above. With this method, spacers can be disposed in a predetermined location in an electro-optic device, and more specifically spacers can be disposed within a surface uniformly. As a result, it becomes possible to reduce, prevent or minimize the occurrence of a problem such that the spacing between substrates becomes uneven within a surface, and thus the display defects associated with such unevenness become less likely to occur.

The droplet discharge unit which can be used in the invention is a droplet discharge unit having: a vibrator which can be expanded and contracted, for example, in response to input driving waveforms; and a droplet discharging head provided with a discharge portion through which a droplet is discharged by the vibrator. The discharge portion is driven by the driving waveforms while moving the droplet discharging head with respect to an discharge target, thereby causing a droplet to be discharged. More concretely, such droplet discharge unit may be an ink jet unit.

DETAILED DESCRIPTION OF PREFERRED EMBODIMENTS

Exemplary embodiments according to the invention are described below with reference to the drawings.

In the exemplary embodiments, use of an ink jet unit enables arbitrary setting of a discharge location to which droplets are discharged and the number of times of discharging, thereby a predetermined amount of a spacer-dispersing solution can be discharged to a predetermined location on a substrate for an electro-optic device. After discharging the spacer-dispersing solution to the substrate for an electro-optic device, the solvent of the spacer-dispersing solution is evaporated spontaneously or by heating, thereby disposing the predetermined number of spacers in a predetermined location on the substrate for an electro-optic device.

Figure 1:
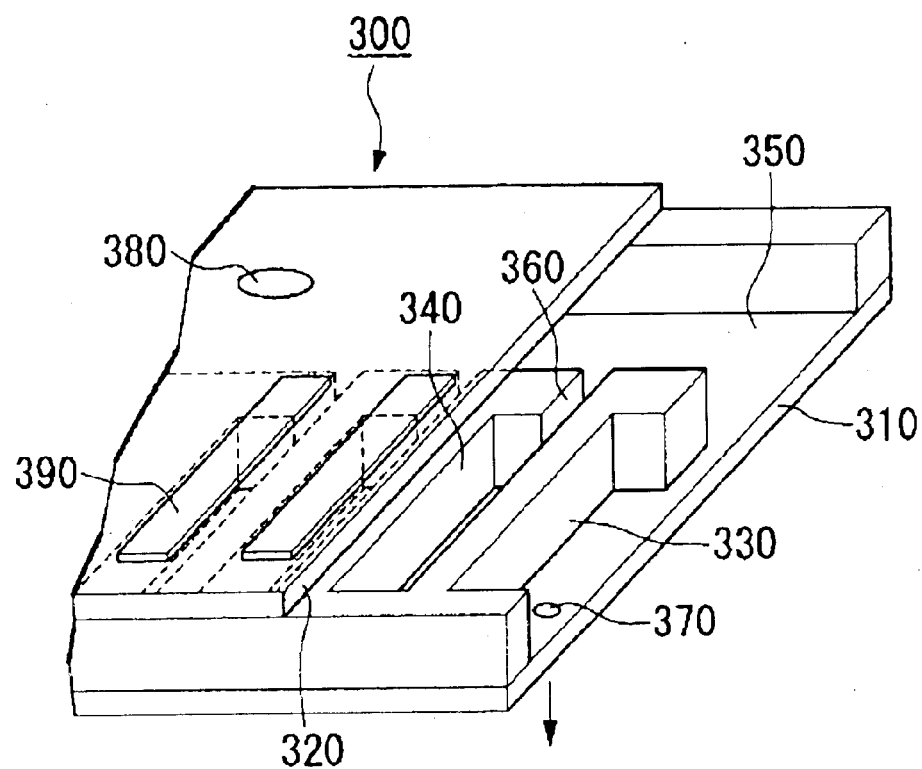
FIG. 1 is a schematic perspective view showing an exemplary embodiment of an ink jet nozzle.
Figure 2:
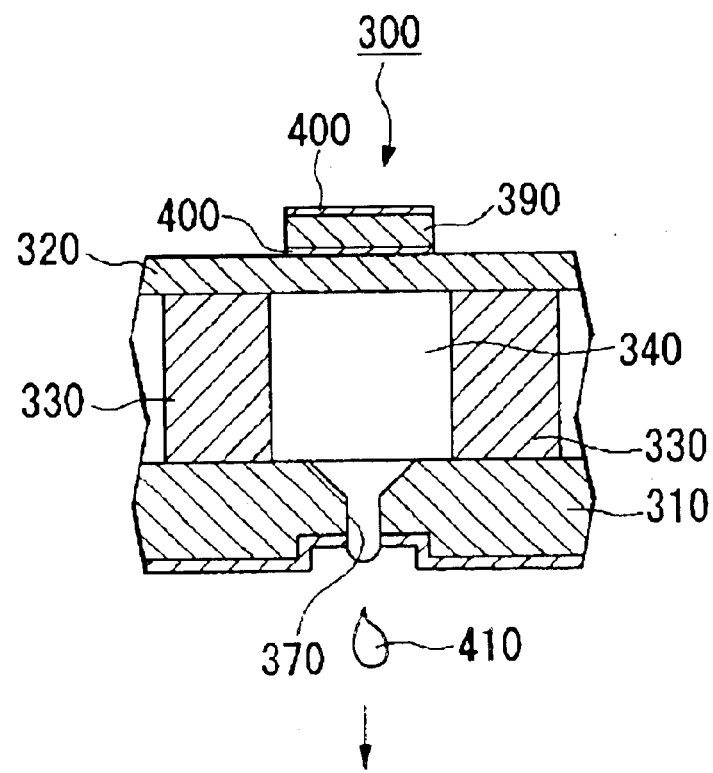
FIG. 2 is a schematic cross-sectional view of the ink jet nozzle shown in FIG. 1.

FIGS. 1 and 2 are a perspective view and a cross-sectional view of an ink jet nozzle 300 in an ink jet unit used in this exemplary embodiment, respectively. As shown in FIG. 1, the ink jet nozzle 300 has, for example, a nozzle plate 310 made of a stainless steel and a diaphragm 320, both are bonded via a partition member (reservoir plate) 330. Between the nozzle plate 310 and the diaphragm 320, a plurality of spaces 340 and a solution pocket 350 are defined by the partition member 330. The spaces 340 and the solution pocket 350 are filled with the spacer-dispersing solution, and each of the spaces 340 communicates with the solution pocket 350 through the respective supply port 360. The nozzle plate 310 is further provided with a nozzle hole 370 to spray a spacer-dispersing solution from the spaces 340. In contrast, a hole 380 is formed in the diaphragm 320, which is used to supply a spacer-dispersing solution to the solution pocket 350.

Further, as shown in FIG. 2, a piezoelectric element 390 is bonded on a surface of the diaphragm 320, opposite from a diaphragm surface facing the space 340. The piezoelectric element 390 is located between a pair of electrodes 400. When energized, the piezoelectric element 390 is flexed so as to protrude outwardly, while the diaphragm 320 bonded to the piezoelectric element 390 is also flexed outwardly together. This increases the volume of the space 340. Therefore, an amount of the spacer-dispersing solution corresponding to an increase in the volume flows into the space 340 through the supply port 360 from the solution pocket 350. Then, by stopping energizing the piezoelectric element 390, the piezoelectric element 390 and the diaphragm 320 are both restored to their initial shapes. This causes the space 340 to be restored to its initial volume, thereby the pressure of the spacer-dispersing solution inside the space 340 is increased. As a result, a droplet 410 of the spacer-dispersing solution is discharged from the nozzle hole 370 toward a substrate for an electro-optic device.

With an ink jet unit having such ink jet nozzle 300, dropping locations of the spacer-dispersing solution can be controlled. In this exemplary embodiment, the spacer-dispersing solution is dropped only on non-pixel regions of the substrate for an electro-optic device. After the spacer-dispersing solution is dropped on a substrate for an electro-optic device, the substrate is heated to evaporate the solvent. As a result, it becomes possible to dispose the spacers in a predetermined location on the substrate.

In this exemplary embodiment, the solvent of the spacer-dispersing solution is a solvent having a boiling point of 150 to 250° C. and a viscosity of 10 to 40 mPa·s. More specifically, a non-hydrous solvent, such as 1-dodecanol, 1,2-ethanediol, 2-butene-1,4-diol, 2-methyl-2,4-pentadiol, phenol, 2-pyrrolidone, 2-phenoxyethanol, 2,2'-dihydroxydiethyl ether, and 2-(2-methoxyethoxy) ethanol, or a mixture of any of those solvents may be used.

The solvents are less prone to evaporate at room temperatures. However, for example, heating the solvents approximately to 60 to 150° C. allows the evaporation of the solvents at proper evaporation rates without overheating substrates. In addition, because the solvents have relatively high viscosities, a droplet 410 discharged from the nozzle hole 370 is to be dropped in a single spherical form instead of being dispersed into a plurality of droplets while dropping. Further, the droplet 410 is hardly scattered into a plurality of droplets when impinging on the substrate. Therefore, it becomes possible to drop a droplet in a predetermined location with reliability.

A method of disposing spacers using an ink jet unit as described above can be applied as a spacer-disposing method for various electro-optic devices. Therefore, the method has been also applied in disposing spacers for a liquid crystal display device in this embodiment. The configuration of a liquid crystal display device, to which a method of disposing spacers according to the invention is applied, is described below.

Figure 3:
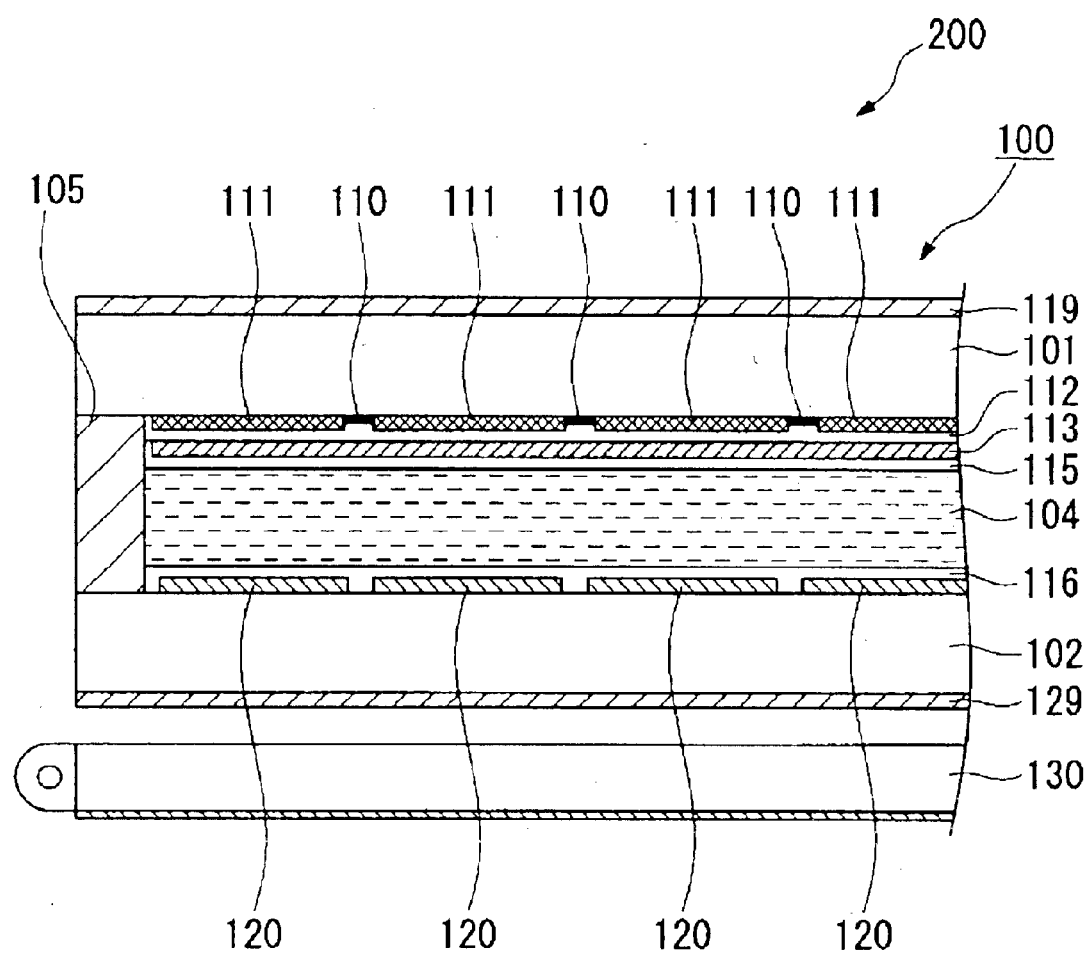
FIG. 3 is a schematic sectional view showing an exemplary embodiment of a liquid crystal display device manufactured by a method in which a method of disposing spacers according to the invention is applied.
Figure 4:
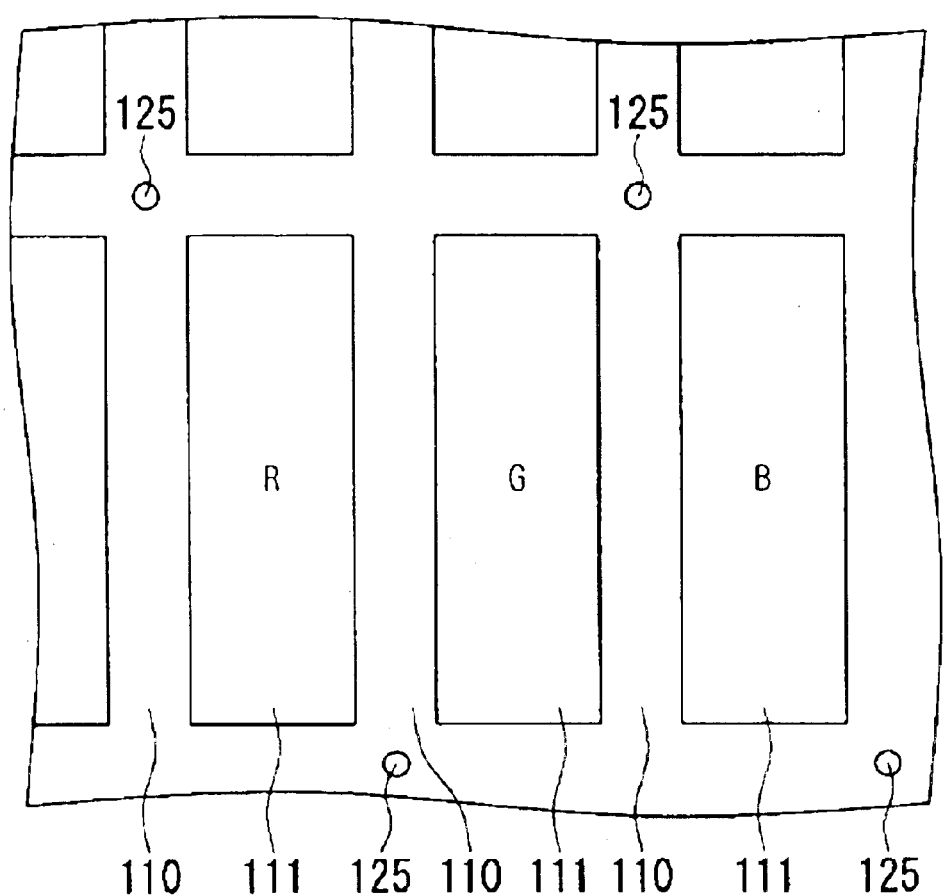
FIG. 4 is a schematic plan view showing the spacer-disposed locations in the liquid crystal display device shown in FIG. 3.

FIG. 3 is a schematic sectional view showing an exemplary embodiment of a liquid crystal display device manufactured by a method to which the above method of disposing spacers is applied. FIG. 4 is a schematic plan view showing locations where spacers are disposed. In this exemplary embodiment, individual layers and members are drawn on scales varying from layer to layer and member to member to make the individual layers and members recognizable dimensions on the drawings.

The liquid crystal display device 200 is configured to have: a liquid crystal panel 100 having an upper substrate 101 and a lower substrate 102, which are opposed to each other, a liquid crystal layer 104 held via spacers 125 (see FIG. 4) between the substrates, and a seal material 105 to seal the liquid crystal layer 104; and a backlight (lighting device) 130 disposed on the rear side of the liquid crystal panel 100 (lower side in the drawing). On the inner surface side of the upper substrate 101 (the side of the liquid crystal layer 104) of the liquid crystal panel 100, there are formed a color filter layer 111, a light-blocking layer 110 formed between each color portion of the color filter layer 111, a planarization layer 112 covering the color filter layer 111 and the light-blocking layer 110, a common electrode 113, and an alignment layer 115. On the outer surface side of the upper substrate 101 (the side of the upper surface in the drawing), there is formed a polarizing layer 119.

In contrast, on the inner surface side of the lower substrate 102 (the side of the liquid crystal layer 104) of the liquid crystal panel 100, there are provided pixel electrodes 120 arrayed in the form of a matrix within a substrate surface, and an alignment layer 116 formed on the upper layer of the pixel electrodes 120. Further, on the outer surface side of the lower substrate 102, a polarizing layer 129 is provided.

In the liquid crystal display device 200, spacers 125 are provided between the upper substrate 101 and lower substrate 102 as described above. However, the spacers 125 are positioned corresponding to the regions where the light-blocking layer 110 has been formed between the color portions of the color filter layer 111, as shown in FIG. 4. In other words, the spacers 125 are disposed only in boundary regions of each pixel electrodes 120, namely non-pixel regions. Accordingly, the spacers 125 hardly causes a failure in display (e.g. a leak of light around a spacer). Incidentally, the liquid crystal display device 200 is manufactured by: forming electrodes, an alignment layer, etc. in advance with respect to one of a pair of substrates; dropping a spacer-dispersing solution on the substrate with the above ink jet unit and evaporate the solvent; and then sealing a space holding the liquid crystal between the substrates.

Exemplary Embodiments

Exemplary embodiments of the invention are described below.

Exemplary Embodiment 1

The spacers have been disposed using the ink jet unit provided with an ink jet nozzle 300 shown in FIGS. 1 and 2.

In this exemplary embodiment, an examination was made for the conditions of discharge from the nozzle 300, the forms of droplets after they had reached the substrate, etc., when spacers dispersed in the solvents listed in Table 1 were discharged. In this examination, the diameter of the nozzle was 20 μm, the amount of a droplet discharged in one discharge operation was about 20 pico liters, and the distance between the nozzle 300 and a substrate (lower substrate 102) was 800 μm. As for the polypropylene glycol, samples having different mean molecular weights were used to examine the relation between the viscosity and the discharge condition, but we did not make any examination for the spacers' arrangement conditions. In addition, the substrates were heated for three minutes at 150° C. after the discharge, and then examined for the spacers' arrangement conditions after the evaporation of the solvents. The substrates used in this exemplary embodiment were ones in accordance with the lower substrate 102 shown in FIG. 3, and they had electrodes and an alignment layer (with a layer thickness of 500 Å) formed thereon. The spacers used here were sphere-shaped resin spacers with a diameter of 3.75 μm.

TABLE 1

| SOLVENT | VISCOSITY (mPa · s) | BOILING POINT (° C.) | DISCHARGED DROPLET CONDITION | SPACERS' ARRANGEMENT CONDITION |
|---|---|---|---|---|
| 1-butanol | 2.95 | 117.7 | x | x |
| 2-methyl-1-pentanol | 6.6 | 148 | x | x |
| 2-heptanol | 6.53 | 160.4 | x | Δ |
| 3-heptanol | 7.1 | 156.2 | x | Δ |
| 1-octanol | 8.93 | 195 | x | ○ |
| 3,5,5-trimethyl-1-hexanol | 11.06 | 194 | Δ | ○ |
| 1-dodecanol | 18.84 | 259 | Δ | x |
| 1,2-propanediol | 56 | 187.3 | ○ | ○ |
| 2-butene-1,4-diol | 21.8 | 235 | ○ | ○ |
| Phenol | 11.04 | 181.75 | Δ | ○ |
| 2-pyrrolidone | 13.3 | 245 | Δ | ○ |
| 2-phenoxyethanol | 30.5 | 244.7 | ○ | ○ |
| 2,2'-dihydroxydiethyl ether | 30 | 244.8 | ○ | ○ |

TABLE 1-continued

| SOLVENT | VISCOSITY (mPa · s) | BOILING POINT (° C.) | DISCHARGED DROPLET CONDITION | SPACERS' ARRANGEMENT CONDITION |
|---|---|---|---|---|
| 2-(2-methoxyethoxy) ethanol | 34.8 | 194.1 | ○ | ○ |
| polypropylene glycol (molecular weight: 400) | 35.2 | — | ○ | — |
| polypropylene glycol (molecular weight: 550) | 45 | — | Δ | — |
| polypropylene glycol (molecular weight: 750) | 54.2 | — | x | — |

In Table 1, in the column of DISCHARGED DROPLET CONDITION, a cross (x) indicates that the droplet was scattered after having reached the substrate or the droplet was not discharged enough; a triangle (Δ) indicates that the droplet was scattered after having reached the substrate in a very rare case; a circle (○) indicates that stable discharge was done without scattering of the droplet after the droplet had impinged on the substrate. In contrast, in the column of SPACERS' ARRANGEMENT CONDITION, a cross (x) indicates that spacers were not able to be concentrated at a target location; a triangle (Δ) indicates that spacers were not concentrated at a target location in a very rare case; a circle (○) indicates that spacers were able to be concentrated at one target point.

As shown in Table 1, in the cases where 1-butanol, 2-methyl-1-pentanol, 2-heptanol, 3-heptanol, and 1-octanol, each having a viscosity less than 10 mPa·s were used as solvents, the droplet was scattered after having reached the substrate, while spacers were also scattered on the substrate. Consequently, the spacers could not be sprayed on a predetermined location. Furthermore, in the cases where 1-butanol, 2-methyl-1-pentanol, and 2-heptanol, each having an especially low viscosity, were used, the droplet was dispersed while dropping and thus was not able to be dropped on a predetermined location in some instances. Even when a solvent having a viscosity not lower than 10 but below 20 mPa·s was used, the droplet was scattered after having reached the substrate in a very rare case.

In the cases where 1,2-propanediol and polypropylene glycol (mean molecular weight: 550 and 750), each having a viscosity above 40 mPa·s were used as solvents, the droplet could not be discharged from the nozzle with stability and accumulated in a tip portion of the nozzle in some instances. Even when a solvent having a viscosity not higher than 40 but above 35 mPa·s was used, the droplet was prevented from being discharged with stability in a very rare case.

In contrast, in the case where 2-methyl-1-pentanol having a boiling point below 150° C. was used as a solvent, the evaporation rate of the solvent was too fast and thus all the spacers could not be concentrated at a predetermined location. The cause of this is probably as follows. Heating the substrate causes the solvent to evaporate gradually, concentrate at a point, and finally disappear through evaporation. However, if a plurality of spacers exists in a droplet, the spacers included in the droplet are increasingly concentrated as the droplet on the substrate surface becomes smaller. However, in this exemplary embodiment, the spacers could not be concentrated at one point because the evaporation rate of the solvent was too fast. Even when a solvent having a boiling point not lower than 150 but below 180° C. was used, spacers were not concentrated at one point in a very rare case.

Further, in the case of 1-dodecanol having a boiling point above 250° C., the evaporation rate became too slow, so that the solvent could not be evaporated sufficiently under the heating conditions of the exemplary embodiment. The solvent could be evaporated by extra heating. However, the heating effect on the substrate, especially the deterioration in the alignment property of an alignment layer was caused in some instances.

The results stated above have shown that in the case where an ink jet unit is used in disposing of spacers, using a solvent with a viscosity of 10 to 40 mPa·s and a boiling point of 150 to 250° C. as a solvent for the ink jet allows stable discharge of droplets and fixed point arrangement of spacers without causing damage to a substrate including an alignment layer. Also, it has been shown that, more preferably, using a solvent with a viscosity of 20 to 35 mPa·s and a boiling point of 180 to 250° C. can make the discharged droplet condition more stable and further enhance the reliability of spacer arrangement.

Exemplary Embodiment 2

Spacers have been disposed using the ink jet unit provided with an ink jet nozzle 300 shown in FIGS. 1 and 2.

In this exemplary embodiment, an examination was made for the conditions of discharge from the nozzle 300, the forms of droplets after they had reached the substrate, etc., when spacers dispersed in the solvents listed in Table 1 were discharged. In this examination, the diameter of the nozzle was 20 μm, the amount of a droplet discharged in one discharge operation was about 20 pico liters, and the distance between the nozzle 300 and a substrate (lower substrate 102) was 800 μm. As for the polypropylene glycol, samples having different mean molecular weights were used to examine the relation between the viscosity and the discharge condition, but an examination for the spacers' arrangement conditions was not made. In addition, the substrates were dried for three minutes at 60° C. after the discharge, and then examined for the spacers' arrangement conditions after the evaporation of the solvents. The substrates used in this exemplary embodiment were ones in accordance with the lower substrate 102 shown in FIG. 3, and they had electrodes and an alignment layer (with a layer thickness of 500 Å) formed thereon. The spacers used here were sphere-shaped resin spacers with a diameter of 6.0 μm.

TABLE 2

| SOLVENT | VISCOSITY (mPa · s) | BOILING POINT (° C.) | DISCHARGED DROPLET CONDITION | SPACERS' ARRANGEMENT CONDITION |
|---|---|---|---|---|
| 1-butanol | 2.95 | 117.7 | x | x |
| 2-methyl-1-pentanol | 6.6 | 148 | x | x |
| 2-heptanol | 6.53 | 160.4 | x | Δ |
| 3-heptanol | 7.1 | 156.2 | x | Δ |
| 1-octanol | 8.93 | 195 | x | ○ |
| 3,5,5-trimethyl-1-hexanol | 11.06 | 194 | Δ | ○ |
| 1-dodecanol | 18.84 | 259 | Δ | x |
| 1,2-propanediol | 56 | 187.3 | ○ | ○ |
| 2-butene-1,4-diol | 21.8 | 235 | ○ | ○ |
| Phenol | 11.04 | 181.75 | Δ | ○ |
| 2-pyrrolidone | 13.3 | 245 | Δ | ○ |
| 2-phenoxyethanol | 30.5 | 244.7 | ○ | ○ |
| 2,2'-dihydroxydiethyl ether | 30 | 244.8 | ○ | ○ |
| 2-(2-methoxyethoxy) ethanol | 34.8 | 194.1 | ○ | ○ |
| Polypropylene glycol (molecular weight: 400) | 35.2 | — | ○ | — |
| Polypropylene glycol (molecular weight: 550) | 45 | — | Δ | — |
| Polypropylene glycol (molecular weight: 750) | 54.2 | — | x | — |

In Table 2, the results (x, Δ, ○) concerning the discharged droplet condition and the spacers' arrangement condition represent the same contents as those in Table 1.

As shown in Table 2, in the cases where 1-butanol, 2-methyl-1-pentanol, 2-heptanol, 3-heptanol, and 1-octanol, each having a viscosity less than 10 mPa·s were used as solvents, the droplet was scattered after having reached the substrate, while spacers were also scattered on the substrate. Consequently, the spacers could not be sprayed on a predetermined location. Furthermore, in the case where 1-butanol, 2-methyl-1-pentanol, and 2-heptanol, each having an especially low viscosity were used, the droplet was dispersed while dropping and thus was not able to be dropped on a predetermined location in some instances. Even when a solvent having a viscosity not lower than 10 but below 20 mPa·s was used, the droplet was scattered after having reached the substrate in a very rare case.

In the cases where 1,2-propanediol and polypropylene glycol (mean molecular weight: 550 and 750), each having a viscosity above 40 mPa·s were used as solvents, the droplet could not be discharged from the nozzle with stability and accumulated in a tip portion of the nozzle in some instances. Even when a solvent having a viscosity not higher than 40 but above 35 mPa·s was used, the droplet was prevented from being discharged with stability in a very rare case.

In contrast, even in the case where 2-methyl-1-pentanol having a boiling point below 150° C. was used as a solvent, a plurality of spacers could be concentrated at one point because the heating temperature was as low as 60° C. However, in this case, the scattering of droplets, etc. were caused because of its low viscosity and thus spacers could not be arranged in a predetermined location in some instances. In the case where 1-butanol having a boiling point of 118° C. was used, spacers could not be concentrated at a point in spite of a low heating temperature of 60° C. because the evaporation rate was too fast. Also, even in the case where the solvent had a boiling point not lower than 150 but below 180° C., spacers were not concentrated at one point in a very rare case.

Further, in the case of 1-dodecanol having a boiling point above 250° C., the evaporation rate became too slow, so that the solvent could not be evaporated sufficiently under the heating conditions of the exemplary embodiment. The solvent could be evaporated by extra heating. However, the heating effect on the substrate, especially the deterioration in the alignment property of an alignment layer was caused in some instances.

The results stated above have shown that in the case where an ink jet unit is used in the step of disposing spacers, using a solvent with a viscosity of 10 to 40 mPa·s and a boiling point of 150 to 250° C. as a solvent for the ink jet allows stable discharge of droplets and fixed point arrangement of spacers without causing damage to a substrate including an alignment layer. Also, it has been shown that, more preferably, using a solvent with a viscosity of 20 to 35 mPa·s and a boiling point of 180 to 250° C. can make the discharged droplet condition more stable and further enhance the reliability of spacer arrangement.

Exemplary Embodiment 3

Spacers have been disposed using the ink jet unit provided with an ink jet nozzle 300 shown in FIGS. 1 and 2.

In this exemplary embodiment, an examination was made for the conditions of discharge from the nozzle 300, the forms of droplets after they had reached the substrate, etc., when spacers dispersed in the solvents listed in Table 1 were discharged. In this examination, the diameter of the nozzle was 12 μm, the amount of a droplet discharged in one discharge operation was about 4 pico liters, and the distance between the nozzle 300 and a substrate (lower substrate 102) was 800 μm. In addition, the substrates were dried for three minutes at 150° C. after the discharge, and then examined for the spacers' arrangement conditions after the evaporation of the solvents. As for the polypropylene glycol, samples having different mean molecular weights were used to examine the relation between the viscosity and the discharge condition, but an examination for the spacers' arrangement conditions was not made. The substrates used in this exemplary embodiment were ones in accordance with the lower substrate 102 shown in FIG. 3, and they had electrodes and an alignment layer (with a layer thickness of 500 Å) formed thereon. The spacers used here were sphere-shaped resin spacers with a diameter of 3.75 μm.

TABLE 3

| SOLVENT | VISCOSITY (mPa·s) | BOILING POINT (°C.) | DISCHARGED DROPLET CONDITION | SPACERS' ARRANGEMENT CONDITION |
|---|---|---|---|---|
| 1-butanol | 2.95 | 117.7 | x | x |
| 2-methyl-1-pentanol | 6.6 | 148 | x | x |
| 2-heptanol | 6.53 | 160.4 | x | Δ |
| 3-heptanol | 7.1 | 156.2 | x | Δ |
| 1-octanol | 8.93 | 195 | Δ | ○ |
| 3,5,5-trimethyl-1-hexanol | 11.06 | 194 | Δ | ○ |
| 1-dodecanol | 18.84 | 259 | Δ | x |
| 1,2-propanediol | 56 | 187.3 | ○ | ○ |
| 2-butene-1,4-diol | 21.8 | 235 | ○ | ○ |
| Phenol | 11.04 | 181.75 | Δ | ○ |
| 2-pyrrolidone | 13.3 | 245 | Δ | ○ |
| 2-phenoxyethanol | 30.5 | 244.7 | ○ | ○ |
| 2,2'-dihydroxydiethyl ether | 30 | 244.8 | ○ | ○ |
| 2-(2-methoxyethoxy) ethanol | 34.8 | 194.1 | ○ | ○ |
| Polypropylene glycol (molecular weight: 400) | 35.2 | — | ○ | — |
| Polypropylene glycol (molecular weight: 550) | 45 | — | Δ | — |
| Polypropylene glycol (molecular weight: 750) | 54.2 | — | x | — |

In Table 3, the results (x, Δ, ○) concerning the discharged droplet condition and the spacers' arrangement condition represent the same contents as those in Table 1.

As shown in Table 3, in the cases where 1-butanol, 2-methyl-1-pentanol, 2-heptanol, 3-heptanol, and 1-octanol, each having a viscosity less than 10 mPa·s were used as solvents, the droplet was scattered after having reached the substrate, while spacers were also scattered on the substrate. Consequently, the spacers could not be sprayed on a predetermined location. Furthermore, in the cases where 1-butanol, 2-methyl-1-pentanol, and 2-heptanol, each having an especially low viscosity were used, the droplet was dispersed while dropping and thus could not be dropped in a predetermined location in some instances. Even when a solvent having a viscosity not lower than 10 but below 20 mPa·s was used, the droplet was scattered after having reached the substrate in a very rare case.

In the cases where 1,2-propanediol and polypropylene glycol (mean molecular weight: 550 and 750), each having a viscosity above 40 mPa·s were used as solvents, the droplet could not be discharged from the nozzle with stability and accumulated in a tip portion of the nozzle in some instances. Even when a solvent having a viscosity not higher than 40 but above 35 mPa·s was used, the droplet was inhibited from being discharged with stability in a very rare case.

In contrast, in the case where 2-methyl-1-pentanol having a boiling point below 150° C. was used as a solvent, the evaporation rate of the solvent was too fast and thus all the spacers could not be concentrated at a predetermined location. Further, in the case of 1-dodecanol having a boiling point above 250° C., the evaporation rate became too slow, so that the solvent could not be evaporated sufficiently under the heating conditions of the exemplary embodiment. The solvent could be evaporated by extra heating. However, the heating effect on the substrate, especially the deterioration in the alignment property of an alignment layer was caused in some instances. Even when a solvent having a boiling point not lower than 150 but below 180° C. was used, spacers were not concentrated at one point in a very rare case.

The results stated above have shown that in the case where an ink jet unit is used in the step of disposing spacers, it is preferable to use a solvent with a viscosity of 10 to 40 mPa·s and a boiling point of 150 to 250° C. as a solvent for the ink jet regardless of the diameter of the nozzle and the discharge amount, which allows stable discharge of droplets and fixed point arrangement of spacers without causing damage to a substrate including an alignment layer. Also, it has been shown that, more preferably, using a solvent with a viscosity of 20 to 35 mPa·s and a boiling point of 180 to 250° C. can make the discharged droplet condition more stable and further enhance the reliability of spacer arrangement. The distance between the nozzle and a substrate does not have to be set to 800 μm, it may range from 500 μm to 2 mm. In addition, the diameter of spacers to be used is not particularly limited, but it is preferably about one-fourth to one-third of the diameter of the nozzle.

Exemplary Embodiment 4

Under the same conditions as those in Exemplary Embodiment 1, spacer-dispersing solutions containing 2,2'-dihydroxydiethyl ether (with a viscosity of 30.0 mPa·s and a boiling point of 245° C.) or 3,5,5-trimethyl-1-hexanol (with a viscosity of 11.1 mPa·s and a boiling point of 194° C.) as a solvent as shown in Table 4 were dropped onto substrates by the ink jet unit having an ink jet nozzle 300. After that, the substrates were heated for three minutes at heating temperatures shown in Table 4, followed by analyzing the substrates for the arrangement condition of spacers and the alignment condition of the alignment layers on the substrates.

TABLE 4

| SOLVENT | HEATING TEMPERATURE | 50° C. | 60° C. | 150° C. | 160° C. |
| --- | --- | --- | --- | --- | --- |
| 2,2'-dihydroxydiethyl ether (VISCOSITY: 30.0 mPa · s; BOILING POINT: 245° C.) | ARRANGEMENT CONDITION | ○ | ○ | ○ | ○ |
| | ALIGNMENT CONDITION | ○ | ○ | ○ | x |
| 3,5,5-trimethyl-1-hexanol (VISCOSITY: 11.1 mPa · s; BOILING POINT: 194° C.) | ARRANGEMENT CONDITION | x | ○ | ○ | ○ |
| | ALIGNMENT CONDITION | ○ | ○ | ○ | x |

In the case where the heating temperatures of substrates were set to 60 and 150° C., spacers could be disposed in a predetermined location and no alignment defect were produced in alignment layers on the substrates. In contrast, in the case where the heating temperature of substrates was set to 50° C., the evaporation rate of the solvents were too slow. Under this condition, when 3,5,5-trimethyl-1-hexanol with a viscosity of 11.1 mPa·s was used, heating substrates to 50° C. made the viscosity further lower. As a result, a droplet, which had reached the substrate, spread out over the substrates faster than the solvent evaporated to come into contact with adjacent dropped droplets and caused the displacement of spacer-arranged locations in some instances. In addition, when the heating temperature of substrates was set to 160° C., the disorder of orientation was produced in the alignment layers in some instances. Therefore, it has been shown that the heating temperature of substrates after the dropping of a spacer-dispersing solution is preferably in the range of 60 to 150° C.

Advantage of the Invention

As described above, a method of disposing spacers on a substrate for an electro-optic device according to the invention uses solvents with a boiling point of 150 to 250° C. and a viscosity of 10 to 40 mPa·s to disperse spacers using a droplet discharge unit, which makes it possible to dispose spacers in a predetermined location accurately.

What is claimed is:

1. A method of disposing spacers in a predetermined location of a substrate for an electro-optic device using a droplet discharge unit, comprising:

discharging droplets onto the substrate for an electro-optic device using the droplet discharge unit, the droplets being formed from a solvent having a boiling point of 150 to 250° C. and a viscosity of 10 to 40 mPa·s with the spacers suspended therein.

2. A method of disposing spacers in a predetermined location of a substrate for an electro-optic device using a droplet discharge unit, comprising:

discharging droplets onto the substrate for an electro-optic device using the droplet discharge unit, the droplets being formed from a solvent having a boiling point of 180 to 250° C. and a viscosity of 20 to 35 mPa·s with the spacers suspended therein.

3. The method of disposing spacers as set forth in claim 1, further comprising: heating the substrate for an electro-optic device to 60 to 150° C. to evaporate said solvent, after having dropped the droplets.

4. The method of disposing spacers as set forth in claim 1, the discharging droplets including dropping the droplets only on non-pixel regions of the substrate for an electro-optic device.

5. The method of disposing spacers as set forth in claim 1, a non-hydrous solvent being used as said solvent.

6. The method of disposing spacers as set forth in claim 1, the solvent being one solvent or a mixture of at least two solvents selected from 1-nonanol, 3,5,5-trimethyl-1-hexanol, 1-decanol, 1-dodecanol, 1,2-ethanediol, 2-butene-1,4-diol, 2-methyl-2,4-pentadiol, phenol, 2-pyrrolidone, 2-phenoxyethanol, 2,2'-dihydroxydiethyl ether, and 2-(2-methoxyethoxy) ethanol.

7. A method of manufacturing an electro-optic device having a pair of substrates and an electro-optic material held between the substrates, comprising:

disposing spacers on at least one of the substrates according to the method as set forth in claim 1.

* * * * *